A. B. LANG.
CRANK PIN TURNING MACHINE.
APPLICATION FILED NOV. 20, 1918.
1,314,876.
Patented Sept. 2, 1919.
3 SHEETS—SHEET 1.
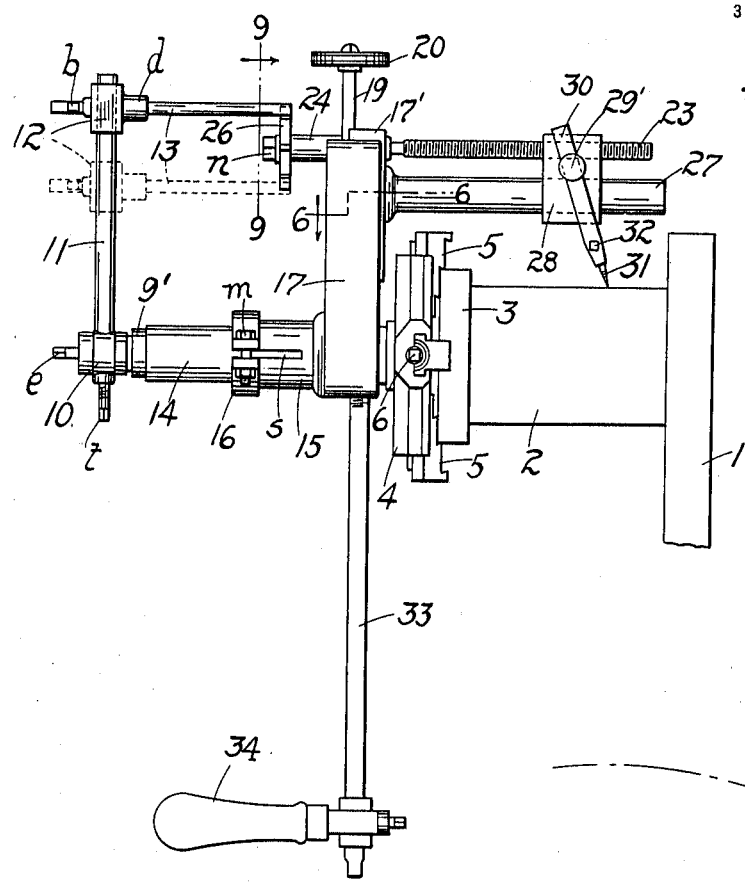
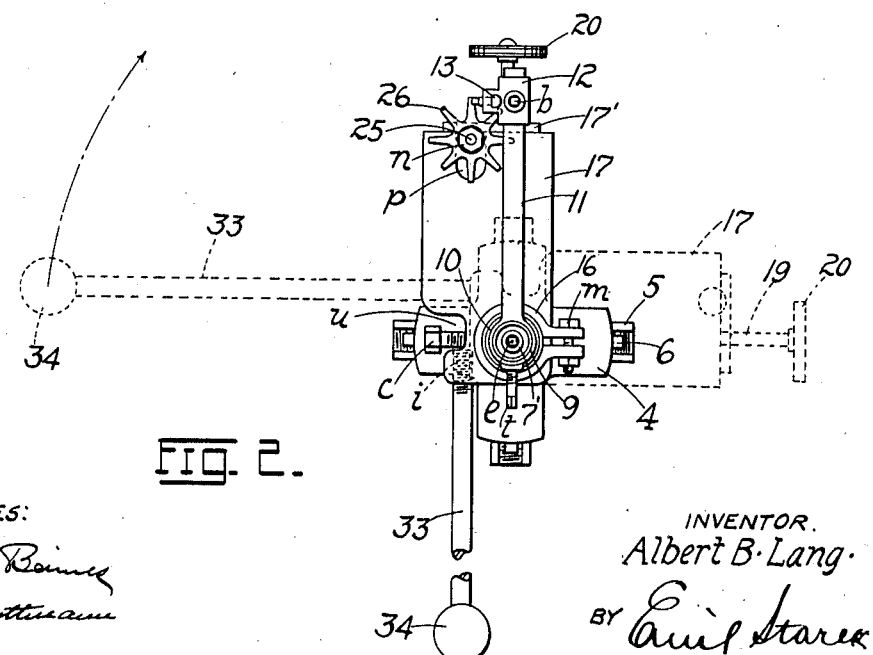
WITNESSES:
Harry A. Reiner
Julius Guttmann
INVENTOR.
Albert B. Lang.
BY Emil Starek
ATTORNEY.

A. B. LANG.
CRANK PIN TURNING MACHINE.
APPLICATION FILED NOV. 20, 1918.

1,314,876.

Patented Sept. 2, 1919.
3 SHEETS—SHEET 2.

WITNESSES:
Harry A. Reiner
Julius Guttmann

INVENTOR.
Albert B. Lang.
By Emil Starek
ATTORNEY.

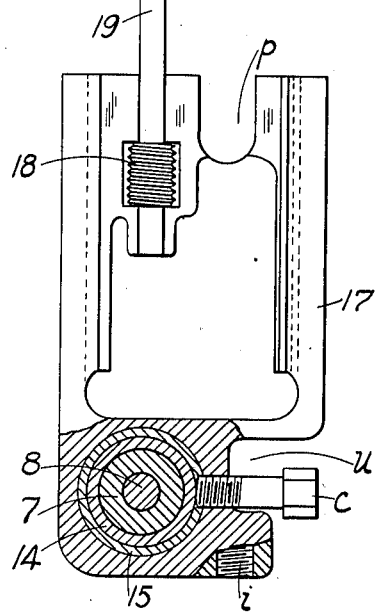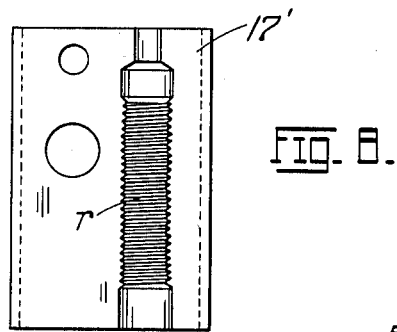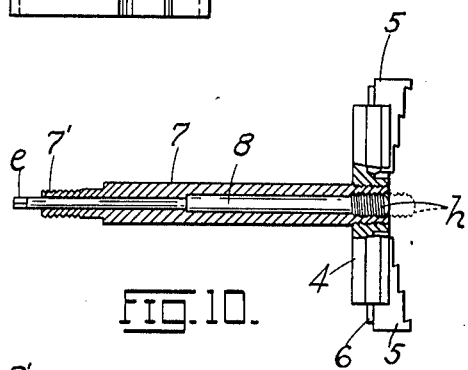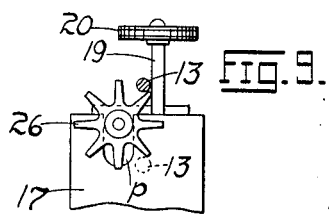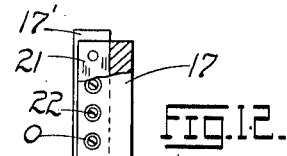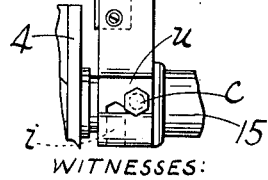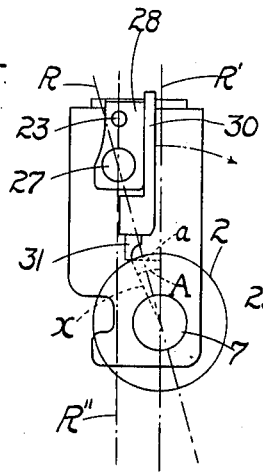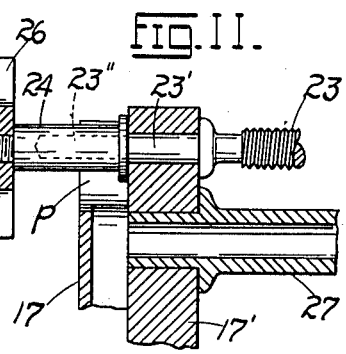

UNITED STATES PATENT OFFICE.

ALBERT B. LANG, OF MAPLEWOOD, MISSOURI.

CRANK-PIN-TURNING MACHINE.

1,314,876.  Specification of Letters Patent.  Patented Sept. 2, 1919.

Application filed November 20, 1918. Serial No. 263,403.

*To all whom it may concern:*

Be it known that I, ALBERT B. LANG, a citizen of the United States, residing at Maplewood, in the county of St. Louis and State of Missouri, have invented certain new and useful Improvements in Crank-Pin-Turning Machines, of which the following is a full, clear, and exact description, reference being had to the accompanying drawings, forming a part hereof.

The present invention is directed to improvements in portable crank-pin turning machines, the object sought being to provide a machine of the character referred to which may be readily applied to the crank-pin, one susceptible of accurate adjustment, one which is light and easily operated, one in which the cutter is so mounted as to bring the cutting edge thereof in the most advantageous position relatively to the axis of the crank-pin (or other stock about which the cutter revolves) so as to insure the most effective shearing contact with the surface to which the cutter is applied, one in which a reciprocating movement is imparted to the cutter by means of a screw-feed rotatable in either direction, and actuated periodically by means of an adjustable tappet, one adapted to be driven either manually or by a suitable motor, one capable of turning a crank pin absolutely true thereby eliminating all thumping of the engine with successive revolutions of the crank pin, and one presenting further and other advantages better apparent from the following detailed description in connection with the accompanying drawings in which—

Figure 3:
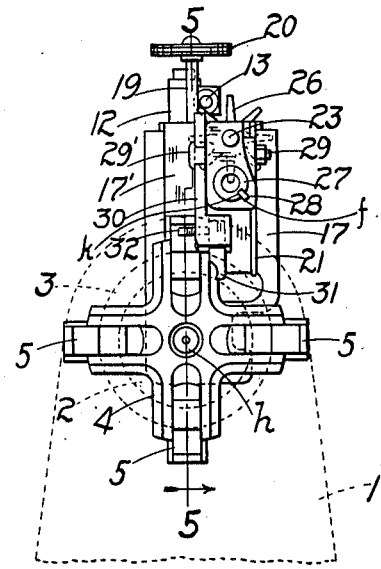
Figure 6:
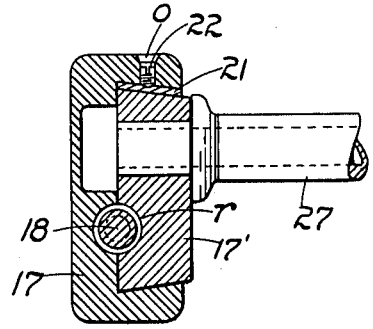
Figure 4:
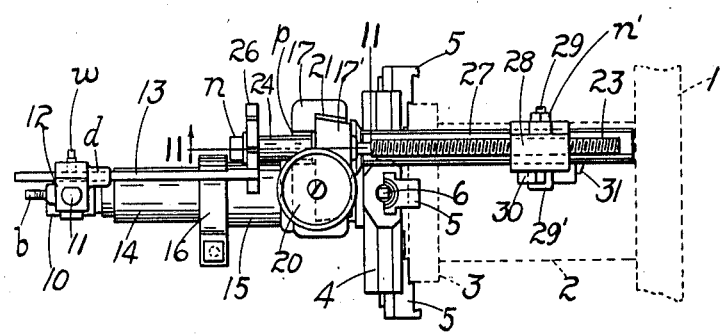
Figure 5:
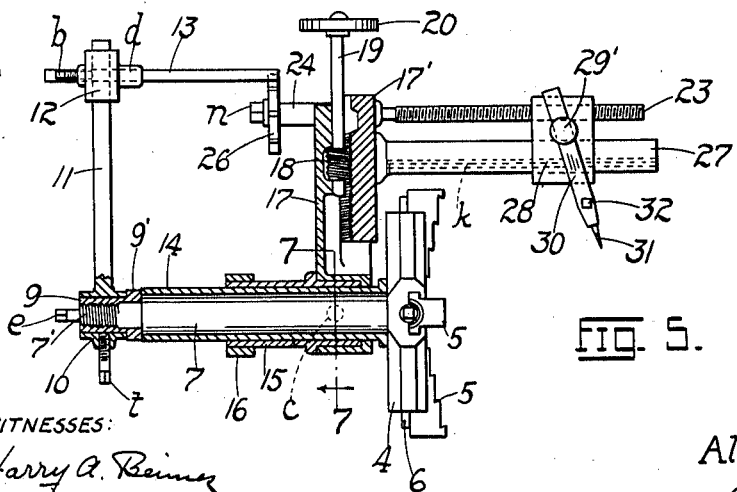

Figure 1 represents a side elevation of the machine attached to an engine crank-pin to be turned; Fig. 2 is a front end elevation thereof; Fig. 3 is a rear elevation of the machine; Fig. 4 is a top plan of the machine; Fig. 5 is a vertical longitudinal section on the line 5—5 of Fig. 3; Fig. 6 is a horizontal sectional detail on the line 6—6 of Fig. 1; Fig. 7 is an inside elevation of the relatively stationary section of the tool carrier, and a cross-section of the hub thereof and the chuck spindle about which the same revolves, on the line 7—7 of Fig. 5; Fig. 8 is an inside elevation of the relatively movable or adjustable section of the tool carrier; Fig. 9 is a transverse vertical sectional detail through the tappet arm on the line 9—9 of Fig. 1; Fig. 10 is a longitudinal middle section through the chuck and tubular spindle thereof; Fig. 11 is a vertical longitudinal sectional detail on the line 11—11 of Fig. 4; Fig. 12 is a side view of the tool carrier; and Fig. 13 is a diagrammatic illustration showing the position of the edge of the cutter relatively to a radial plane through the rotation axis of the tool carrier and the main point of support of the tool, and to a radial line drawn parallel to a line through the axes of the feed screw and guide rail for the block supporting the cutter.

Referring to the drawings, 1 represents a crank arm of an engine, and 2 the crank pin thereof, the outer end of the pin being provided with the usual flange 3 as well understood in the art. The machine comprises a chuck 4 provided with the usual expansion jaws 5 operated by the screws 6 to the heads of which a key or wrench (not shown) is applied as well understood in the art, the outer faces of the jaws being provided with step formations as shown for gripping different sizes of flanges 3 of crank pins intended to be turned. The chuck 4 is provided with a tubular spindle 7 through which is passed a centering rod 8 terminating at the chuck end in a screw head $h$ which screws into the chuck terminal of the spindle, the opposite end of the rod terminating in a square portion $e$ for receiving a socket wrench or key (not shown). By driving the rod 8 outwardly so as to cause the tip of the head $h$ to engage the geometric center or axis of the flange 3 (which center is usually marked) the chuck may be accurately centered to the crank pin before the latter is turned by the cutting tool. The free end of the spindle 7 terminates in a reduced threaded portion 7′ over which is passed a socket 9 terminating at its inner end in an enlarged portion or flange 9′, said flange bearing against the shoulder or offset formed between the reduced portion 7′ and the main body of the spindle 7. To the socket 9 is set-screwed by a screw $t$ the hub portion 10 of a post or bracket 11, the latter having mounted slidably thereon a block 12 held to the post in any adjusted position by the screw $b$, the block being provided with an adjustable tappet 13 operating through the block and through a tubular bearing $d$ formed thereon, said tappet being secured in any adjusted position by a set screw $w$ as shown. In the normal operation of the machine, the parts are set so as to have the post 11 in a vertical position, the tappet 13 projecting horizontally toward the feed-screw of the machine to be presently referred to.

Passed loosely over the spindle 7 and held against longitudinal or axial displacement between the chuck 4 and the flange 9' of the socket 9, is a sleeve 14 about which is in turn passed the hub 15 of the tool carrier, the hub being clamped to the sleeve 14 by a strap 16 the terminals of which are drawn together by a screw-bolt m (Fig. 2). Preferably, the hub is formed with a longitudinal slit s open at the outer end so that the walls of the hub may readily yield to the action of the strap 16 and be caused to frictionally grip or engage the periphery of the sleeve 14. The tool carrier comprises a relatively stationary section 17 to which the hub 15 is directly secured, and a movable or adjustable section or block 17' dovetailing into the stationary section (Fig. 6). The block 17' is provided on its inner face with a semi-cylindrical threaded grooved portion r with which meshes the screw member 18 on the adjusting stem 19, the latter terminating at its upper end in an operating disk or wheel 20. From the parts just described it is obvious that by the turning of the stem 19 in proper direction any desired adjustment of the block 17' may be secured. Preferably there is interposed between one of the sides of the block 17' and the wall of the groove in which it reciprocates, a suitable wearing plate 21 which is held against the block with the desired pressure by means of a series of screws 22 passed through the openings o formed in the side wall of the section 17 of the tool carrier. Mounted rotatably on the tool carrier section or block 17' is a feed screw 23 provided at one end with a cylindrical portion 23' passed loosely through said block, and terminating in a reduced extension 23" over which is passed with a drive fit the socket end of the extension arm 24, the latter terminating in a reduced threaded stem 25 over which is passed the star wheel or disk 26 held in place by a nut n, the tool carrier section 17 being formed with a depression or pocket p opposite the arm 24 to allow for the necessary play of the section 17' during any adjustments thereof. The parts 23, 24 and 26 secured to one another as described, rotate as a unit with any rotation of the disk 26, no importance however being attached to the specific method here described of mounting the screw, any other suitable construction falling within the purview of the skilled mechanic answering my purpose. Disposed below the feed-screw and parallel thereto and secured to the member 17' substantially as shown in Fig. 11, is a tubular rail or guide 27 for guiding the tool supporting block 28, the latter being provided at a point between the members 23 and 27 with a rotatable stem or bolt 29 terminating at one end in a slotted head 29' through which is passed the tool shank 30 carrying the cutter blade 31, the latter being adjustable in the shank and held in position by a set screw 32 as shown. A nut n' clamps the parts against movement once the shank 30 is set to proper pitch. The periphery of the rail 27 is preferably formed with a longitudinal groove k, the block 28 carrying a feather f traversing said groove, this arrangement insuring against rotary displacement of the block and insuring a true rectilinear travel therefor as the same is caused to reciprocate along the rail by the rotation of the feed screw operating therethrough. The tool carrier section 17 is provided at a point to one side of the rotation axis of the carrier (said axis being the axis of the spindle 7) with a screw socket i into which is screwed the fixed end of a crank arm 33 terminating in an operating handle 34 as shown. The inner end of the socket i terminates (Fig. 12) at the base of the U-shaped depression u formed in the member 17 opposite the inner portion of the hub 15 (said inner portion forming a bushing for the member 17 as clearly shown in Fig. 5), the depression accommodating a set screw c the stem of which passes through the wall surrounding the passageway of the member 17 receiving the inner end of the hub 15, and through the wall of the hub, the end of the stem bearing directly against the sleeve 14 which as indicated, is free to rotate about the spindle 7 (Fig. 5). By the arrangement just described, the hub 15 of the tool carrier is not only rigidly secured to the tool carrier section 17, but to the sleeve 14, the parts 17, 17', 15 and 14 revolving as a unit about the axis of the spindle 7. Any other mechanical method however of mounting the tool carrier, falling within the purview of the skilled mechanic may be substituted for the arrangement herein shown and described.

Referring to the diagrammatic illustration in Fig. 13 it will be seen that the point of application of the blade 31 to the periphery of the stockpiece or crank-pin 2 which is to be turned, is to one side or rearward of a radial line or plane R passed through the axis of the spindle 7 and the axis of the rail 27 opposite which we may regard the shank 30 of the tool to be secured to the sliding block 28. Again, it will be observed, that the point of application of the blade to the periphery of the crank-pin is at the outer end of the sine a of the angle A made by a line x drawn from the axis of the spindle 7 to the blade and a line or plane R' through said axis and parallel to the line or plane R" drawn through the axes of the feed-screw 23 and tube rail 27 respectively, the shank 30 of the tool being disposed in a plane parallel to the said planes R' and R''. The radial line R' it will be seen intersects the periphery of the crank-pin 2 at the highest point (Fig. 13), the line R'' intersecting said periphery at a point considerably lower, the distance between said lines representing the distance to which the axes of the members 23 and 27 is offset from the axis of the spindle 7 and from the radial plane R'. In other words this distance represents approximately the distance that the tool supporting block 28 is offset from the rotation axis of the tool carrier (17, 17'), said offset causing the cutting edge of the blade to lag behind the point of intersection between of the line R' with the periphery of the crank pin, this lag (represented by the sine $a$ of the angle A) permitting the tool to exert the proper shearing action against the surface of the material to be cut. The lag may be said to be the distance that the cutting edge of the tool is behind the radial plane (R') through the axis of revolution of the blade (axis of the spindle 7) parallel to the plane of reciprocation of the tool, that is to say, the plane R'' passing through the axes of the members 23 and 27.

The operation will be readily understood from the foregoing and is substantially as follows: Assuming that the crank-pin 2 to be turned is rigidly supported by the crank arm 1 of the engine as shown in Fig. 1 of the drawings. The operator then clutches the flange 3 of the crank-pin with the arms 5 of the chuck 4 thereby rigidly securing the spindle 7 to the crank pin (or other stock-piece intended to be turned). In thus securing the chuck to the crank-pin, care should be taken to bring the axes of the chuck spindle 7 and of the crank pin into alinement, which, as previously described, is accomplished by properly applying the centering rod 8 to the geometric center of the flange 3. In operating the machine care should be taken that the post 11 is vertical and the tappet 13 adjusted so as to cause the free end thereof to come between the outer terminals of the arms of the star disk 26 (Figs. 1 and 9). The tool 31 should then be properly adjusted to engage the periphery of the crank pin, the depth of cut or the amount of metal to be shaved off being determined by the radial adjustment imparted to the block 17' by the screw 18, this adjustment, as obvious from the drawings, determining the depth of cut. The operator then attaches the crank arm or lever 33 and rotates the tool carrier (17, 17') clockwise or to the right. With each revolution the stationary tappet 13 strikes an arm of the star disk (there are eight arms to the disk) thereby rotating the feed screw 23 through an arc represented by the space between two consecutive arms of the disk, in the present example, an arc of forty-five degrees. The periodic rotations thus imparted to the feed screw with successive rotations of the tool carrier impart corresponding rectilinear advances to the block or tool support 28 (which acts as a nut) thereby advancing the tool 31 along the crank pin or stock-piece 2 around which the tool is at the same time revolving, being coupled to the tool carrier through the members 23 and 27. The block 28 in its advances is guided by the rail or tube 27 as already described. When the tool reaches one end of the crank pin it is caused to advance to the opposite end by simply reversing the rotation of the feed screw. This may be done by adjusting the tappet in a direction across the axis of the star disk 26 so as to bring the free end of the tappet to a position substantially diametrically opposite to the first position (see dotted positions Figs. 1 and 9), whereby, with a rotation of the tool carrier still in the same direction, the feed screw will now be turned in the reverse direction and the tool advanced along the work in the opposite direction. With successive changes in the longitudinal travel of the tool, the pitch of the tool shank must obviously be changed to permit the tool to reach the "corners" or intersections of the crank pin with the members 1 and 3. So, too, with successive reciprocations of the tool, the necessary turns must be imparted to the screw 18 to properly feed the tool to the work, these turns being done manually after first bringing the machine to a standstill at the conclusion of a previous cut. As seen from the foregoing, the only parts that are stationary during the operation of the machine are the chuck 4, spindle 7, post 11 and tappet 13 (and of course the crank pin 2), all other parts revolving about the axis of the spindle 7, and the tool 31 at the same time reciprocating along the work. The machine may obviously be changed in many details without involving a departure from the spirit of the invention.

Having described my invention what I claim is:

1. In combination with a spindle securable to a stock-piece to be turned, a sleeve loosely mounted on the spindle, a tool carrier secured to the sleeve and revolving therewith about the axis of the spindle, a feed-screw on the carrier, a tool-supporting block traversed by the feed screw, a rail on the carrier disposed parallel to the feed-screw and passing loosely through the block for guiding the same, a cutter on the block mounted to one side of the rail and adapted to engage the stock-piece, a wheel on the feed-screw provided with a series of radial arms, a tappet on the spindle adapted to engage an arm of the wheel with each revolution of the carrier and thereby impart periodic rotations to the feed-screw and corresponding advances to the block and cutter secured thereto.

2. In combination with a spindle securable to a stock-piece to be turned, a sleeve mounted on and free to revolve about the axis of the spindle, a tool carrier secured to the sleeve, a feed-screw, a radially toothed disk on the screw, a tool-supporting block traversed by the screw, a guide member loosely traversing said block, and a tappet for the disk adjustable across the axis of the disk to impart rotation thereto in either direction, whereby a reciprocating movement may be imparted to the tool-supporting block.

3. In a machine of the character described, a chuck provided with an axially disposed tubular spindle, a centering rod traversing the bore of the spindle and operating through the chuck, the free end of the spindle being screw-threaded, a socket passed over the threaded terminal of the spindle, a sleeve passed loosely over the spindle and interposed between the socket and chuck, a tool carrier, a hub on the carrier provided with a longitudinally split extension passed over the sleeve, a set-screw on the tool carrier having its inner end passed through the walls of the hub and frictionally engaging the periphery of the sleeve, a strap passed over the split portion of the hub and clamping the hub to the sleeve whereby the tool carrier and its hub and the sleeve rotate as a unit about the axis of the spindle, a post rigidly secured to the socket at the free end of the spindle, a tappet arm adjustable along the post projecting parallel to the spindle toward the tool carrier, the said tool carrier being provided with a radially movable section adjustable to and from the axis of the spindle, a feed-screw on said movable section, a tool guide or rail leading from said movable section of the tool carrier and disposed parallel to the feed-screw, a tool support actuated by the feed-screw and freely traversing the guide or rail, a cutter secured to the support and positioned to engage a stock-piece to which the chuck is secured, a star disk coupled to the feed screw and revolving in the path of the tappet arm projecting from the post aforesaid, the parts operating substantially as, and for the purpose set forth.

In testimony whereof I affix my signature in presence of two witnesses.

ALBERT B. LANG.

Witnesses:
EMIL STAREK,
JULIUS GUTTMANN.